(12) United States Patent
Bartlett et al.

(10) Patent No.: US 8,943,328 B2
(45) Date of Patent: Jan. 27, 2015

(54) KEY ROTATION FOR ENCRYPTED STORAGE MEDIA

(75) Inventors: Wendy B. Bartlett, Los Altos, CA (US); Vijaykumar Immanuel, Sunnyvale, CA (US); Mihai Damian, Campbell, CA (US); Geoffrey Ignatius Iswandhi, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1164 days.

(21) Appl. No.: 12/696,799

(22) Filed: Jan. 29, 2010

(65) Prior Publication Data

US 2011/0191594 A1 Aug. 4, 2011

(51) Int. Cl.
| | | |
|---|---|---|
| G06F 11/30 | (2006.01) | |
| G06F 21/60 | (2013.01) | |
| G06F 11/20 | (2006.01) | |
| H04L 29/06 | (2006.01) | |
| G06F 12/14 | (2006.01) | |
| H04L 9/06 | (2006.01) | |

(52) U.S. Cl.
CPC .......... *G06F 21/602* (2013.01); *G06F 11/2056* (2013.01); *G06F 11/2071* (2013.01); *H04L 63/068* (2013.01); *G06F 12/14* (2013.01); *G06F 11/2023* (2013.01); *H04L 9/06* (2013.01)
USPC ........................................ 713/189

(58) Field of Classification Search
CPC .............. H04L 63/068; G06F 11/2056; G06F 11/2071; G06F 21/602
USPC ........................................ 713/189
See application file for complete search history.

(56) References Cited

U.S. PATENT DOCUMENTS

| | | | |
|---|---|---|---|
| 4,888,802 A | 12/1989 | Cooney | |
| 5,051,887 A | 9/1991 | Berger et al. | |
| 5,604,902 A * | 2/1997 | Burkes et al. | 1/1 |
| 5,933,653 A | 8/1999 | Ofek | |
| 6,073,218 A * | 6/2000 | DeKoning et al. | 711/150 |
| 6,397,307 B2 | 5/2002 | Ohran | |
| 6,691,245 B1 * | 2/2004 | DeKoning | 714/6.31 |
| 7,007,143 B2 * | 2/2006 | Cochran | 711/162 |
| 7,240,197 B1 | 7/2007 | Yamagami et al. | |
| 7,627,756 B2 | 12/2009 | Fujibayashi et al. | |
| 7,697,690 B2 * | 4/2010 | Fu et al. | 380/277 |
| 2005/0015353 A1 * | 1/2005 | Kumar et al. | 707/1 |
| 2005/0102603 A1 * | 5/2005 | Tapper et al. | 714/770 |
| 2006/0136732 A1 | 6/2006 | Vandermolen | |
| 2006/0288008 A1 * | 12/2006 | Bhattiprolu et al. | 707/9 |
| 2007/0079119 A1 | 4/2007 | Mattsson et al. | |
| 2007/0079140 A1 | 4/2007 | Metzger et al. | |
| 2008/0071997 A1 * | 3/2008 | Loaiza et al. | 711/154 |
| 2008/0240434 A1 * | 10/2008 | Kitamura | 380/255 |
| 2008/0260159 A1 * | 10/2008 | Osaki | 380/277 |
| 2009/0060201 A1 | 3/2009 | Rhodes et al. | |
| 2009/0196414 A1 | 8/2009 | Mittal et al. | |
| 2009/0199016 A1 | 8/2009 | Kishi | |
| 2009/0268903 A1 * | 10/2009 | Bojinov et al. | 380/45 |
| 2009/0271638 A1 * | 10/2009 | Kawakami et al. | 713/193 |
| 2010/0161995 A1 * | 6/2010 | Browning | 713/189 |
| 2011/0296195 A1 * | 12/2011 | Nakagawa et al. | 713/189 |

OTHER PUBLICATIONS

Ingrain Networks, Online Key Rotation with Ingrain, http://www.ingrian.com/resources/sol_briefs/Ingrian%20online%20key%20rotation.pdf, Jun. 4, 2007, 2 pages.

* cited by examiner

*Primary Examiner* — Michael Chao

(57) ABSTRACT

An I/O module is provided to service I/O requests from a host to access storage media. Data blocks of the storage media are encrypted with an old key, and the I/O module performs key rotation to cause data blocks to be re-encrypted with a new key.

20 Claims, 6 Drawing Sheets

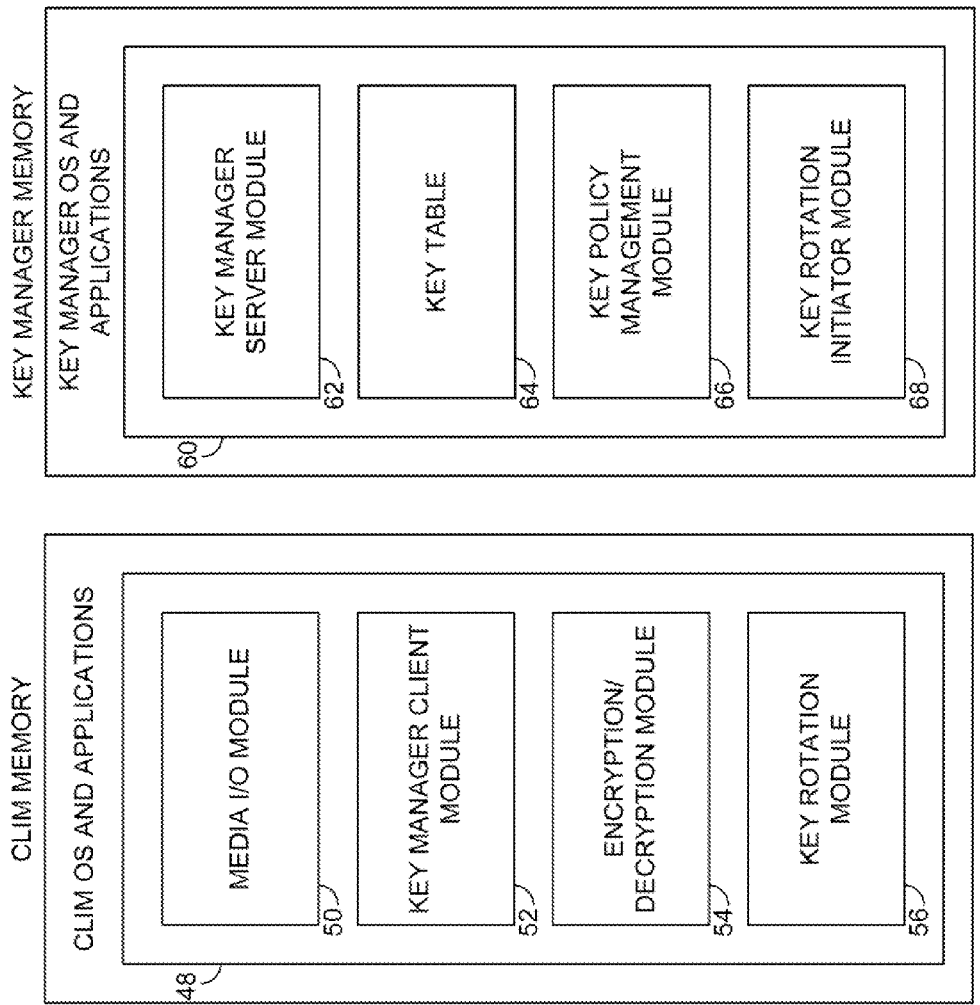

KEY ROTATION FOR ENCRYPTED STORAGE MEDIA

BACKGROUND

In the art of computing, it is desirable to encrypt data stored on persistent storage media, such as hard disk drives. Encryption protects the data from unauthorized access, and theft of the media upon which the data is stored.

Data is encrypted using encryption keys, and it is desirable periodically rotate encryption keys. For data that is already encrypted, the key rotation process comprises reading data encrypted with the old encryption key from the storage media, decrypting the data using the old key, encrypting the data with the new key, and writing the data encrypted with the new key back to the storage media.

In the art of computing, it is also desirable to provide redundancy so that operation of a computer system can continue after the failure of a component. One method known in the art for providing storage media redundancy is to mirror the data. In a mirrored configuration, two storage devices are provided, and the same data is stored on each device. If one device fails, the data is still available on the other device.

To enhance storage media redundancy further, it is known in the art to provide two or more I/O managers for each storage device. In the event that one of the I/O managers fails, mirrored operation can continue since each storage device continues to have at least one functioning I/O manager.

In systems having high availability and redundancy, it is desirable to have the ability to perform key rotation while the system continues normal operation. However, it is challenging to rotate keys during normal operation with mirrored storage devices having redundant I/O managers. During key rotation, some of the data on the storage device is encrypted with the old encryption key, and other data is encrypted with the new encryption key, and care must be taken to ensure that data is read and written with the proper key.

BRIEF DESCRIPTION OF THE DRAWINGS

The Figures depict embodiments, examples, implementations, and configurations of the invention, and not the invention itself.

FIG. 4 shows memory associated with the cluster I/O manager, in accordance with examples of the present invention.

FIG. 5 shows memory associated with the key manager, in accordance with examples of the present invention.

FIG. 6 shows memory associated with the host, in accordance with examples of the present invention.

Figure 1:
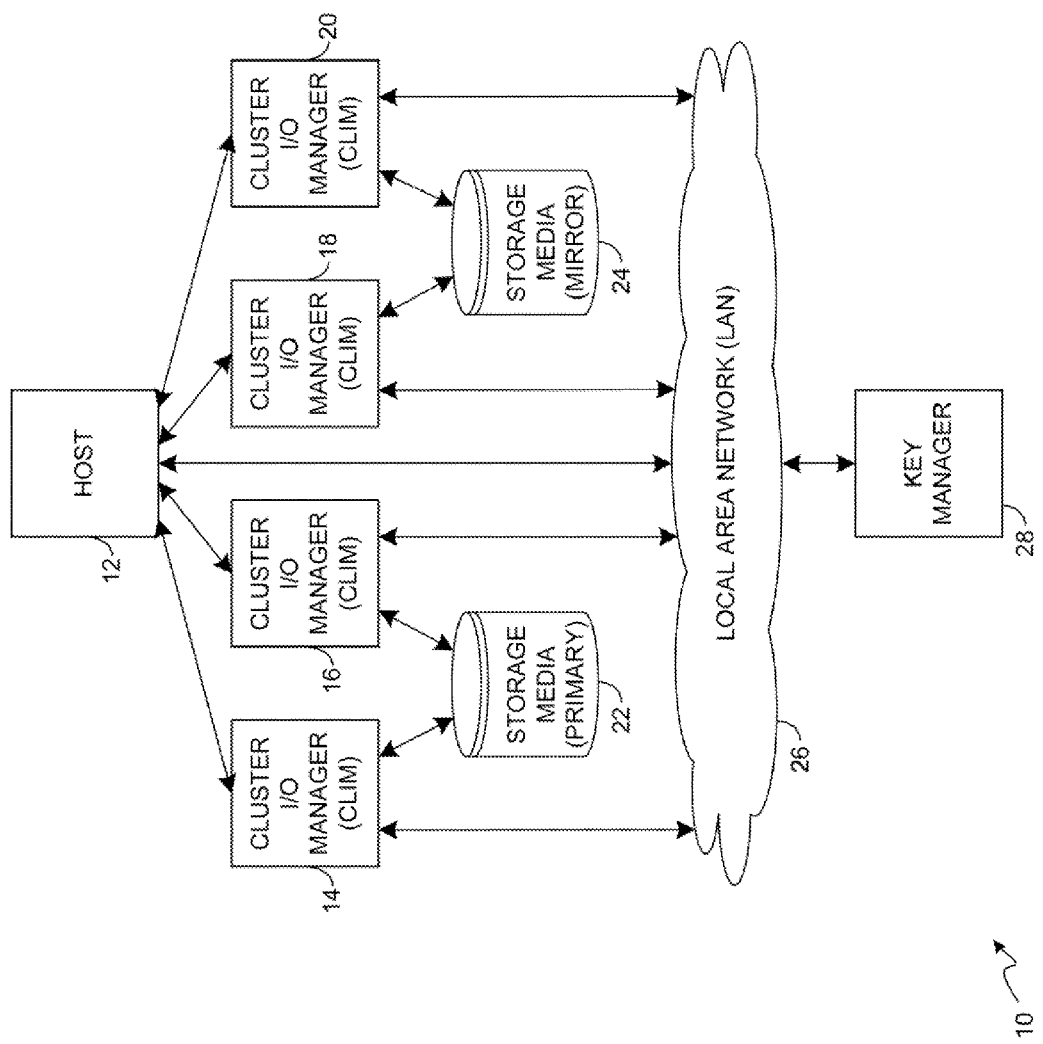
FIG. 1 is a block diagram of a computing environment in which examples of the present invention are deployed, in accordance with examples of the present invention.

DETAILED DESCRIPTION in the foregoing description, numerous details are set forth to provide an understanding of the present invention. However, it will be understood by, those skilled in the art that the present invention may be practiced without these details. While the invention has been disclosed with respect to a limited number of embodiments and examples, those skilled in the art will appreciate numerous modifications and variations therefrom. It is intended that the appended claims cover such modifications and variations as fall within the true spirit and scope of the invention.

Examples of the present invention perform key rotation in computer systems having mirrored storage devices, with each storage device coupled to two cluster I/O manages (CLIMs), which in turn are coupled to a host. A key manager is coupled to the CLIMs, and stores encryption keys used to encrypt and decrypt the data on the storage devices.

In accordance with examples of the invention, when key rotation is desired for a particular storage device, a first CLIM coupled to the storage device is signaled to perform the key rotation, and a second CLIM coupled to the storage device is signaled to suspend I/O to the storage device while the first CLIM performs the key rotation. The host also transmits to the first CLIM an indication that identifies the areas of the storage device that are in use. Areas of the storage device that are not being used to store data do not need to undergo key rotation, thereby reducing the duration of the key rotation process.

The process of encryption transforms plaintext data into encrypted data using an encryption key. The process of decryption transforms encrypted data back into plaintext form using a decryption key. Encrypted data is secure because it cannot be decoded into plaintext form without the decryption key. As used herein, the term "key rotation" includes transforming plaintext data to encrypted data, transforming encrypted data to plaintext data, and transforming data encrypted with a first encryption key into data encrypted with a second encryption key.

There are two types of encryption, asymmetric and symmetric. Asymmetric encryption uses an encryption key to encrypt the data, and a different decryption key to decrypt the data. Encryption keys can be public so that anyone can encrypt the data, and the decryption keys can be kept private so that only the key holder can decrypt the data. RSA encryption is an example of asymmetric encryption. Asymmetric encryption is especially useful for communication between remote entities or devices, since each entity or device does not need to know the secret key of the other entity or device. For example, secure communication between devices coupled by the Internet is typically performed by asymmetric communication.

Symmetric encryption uses the same key for both encryption and decryption. The key is kept secret. Blowfish, Defense Encryption Standard (DES), triple DES, and Advanced Encryption Standard (AES) are typical examples of symmetric encryption. Symmetric encryption is well suited for applications having large amounts of data accessed by the same device or entity, since the device or entity can keep the key secret.

The algorithms used in symmetric encryption are bidirectional. Decryption is the reverse process of encryption. Symmetric block-level encryption, sometimes referred to as a block cipher, divides the data to be encrypted into blocks or groups of characters, and the encryption algorithm is applied to each block. Key length varies according to the cipher, with DES having 56-bit keys, and AES having 1.28-bit, 192-bit, or 256-bit keys. IEEE Standard 1619 provides for cryptographic protection of data on block-oriented storage devices, such as disk drives, flash memory, optical drives, and the like.

The discussion below assumes that symmetric encryption will be used when describing examples of the present invention. Accordingly, the terms "key" and "encryption key" are used interchangeably when referring to encryption and decryption processes. However, those skilled in the art will recognize that asymmetric encryption may be used with examples of the present invention. If asymmetric encryption is used, than a different decryption key is used to perform decryption operations.

FIG. 1 is a block diagram of computing environment 10, in which examples of the present invention are deployed. Environment 10 includes host 12, cluster I/O managers (CLIMs) 14, 16, 18, 20, storage media 22 and 24, local area network (LAN) 26, and key manager 28. CLIMs 14, 16, 18, and 20 are coupled to host 12. Typically, the host and CLIMs will be coupled by a high speed fabric, such as InfiniBand or ServerNet switched fabrics, or Fibre Channel, iSCSI or SCSI connections. ServerNet switched fabrics are used in NonStop computing environments provided by Hewlett-Packard Company. Of course, other connection fabrics may be used, such as PCI and PCIe connections, Ethernet connections, USB connections, Firewire connections, and the like. Although only single connections are shown in FIG. 1, redundant connections may also be provided. The connections between the CLIMs and the storage media will typically be connections used to connect disk drives to controllers, such as IDE, SATA, SAS, Fibre Channel (FC) or SCSI connections. Of course, other connections may also be used. Host 12, CLIMs 14, 16, 18, 20, and key manager 28 are all coupled to LAN 26.

Only connections and devices needed to understand examples of the present invention are shown in FIG. 1. Of course, in a typical configuration, other connections and devices will be present. For example, other service and management processors may be provided, and additional redundant connections may be provided.

During normal operation, storage media 22 is a primary storage device, and storage media 24 mirrors the data stored on storage media 22. In general, write operations must be performed to both storage devices, but read operations need only be serviced from one of the storage devices. Typically, the storage device that services read operations is the primary storage device, and the other storage device is the mirror storage device. However, the primary and mirror storage devices may service different read operations simultaneously to allow for load balancing.

Also note that each storage media is coupled to two CLIMs. Typically, the path between one CLIM and a storage device will be designated as an active path that will carry all I/O requests during normal operation, and the path between the other CLIM and the storage device will be designated as a backup path that will only carry I/O requests in the event that the active path fails.

Host 12 is responsible for managing the mirrored volume, and is responsible for sending data to be written to the mirrored volume to both storage media 22 and 24. CLIMs 14, 16, 18, and 20 are responsible for encrypting and decrypting data blocks as the data blocks are written to and read from storage media 22 and 24.

As will be discussed in greater detail below, the encryption keys themselves are not stored on storage media 22 and 24. However, a key name is stored on each storage media. When the CLIMs are initialized, the CLIMs retrieve the key name from the storage media and provide the key name to key manager 28. Key manager 28, in turn, provides the encryption key to the CLIMs, which use the encryption key to access the data on the storage media. Although not shown in FIG. 1, it may be desirable to provide a redundant key manager to provide keys to CLIMs 14, 16, 18, and 20 in the event that key manager 28 fails.

For the purposes of understanding examples of the present invention, host 12, CLIMs 14, 16, 18, and 20, and key manager 28 can all be viewed as general purpose computers. Of course, in an actual deployment, the host, CLIMs, and key manager will have different capabilities. For example, host 12 may have a greater number of faster CPUs and significantly more memory than CLIMs 14, 16, 18, and 20, and key manager 28.

Figure 2:
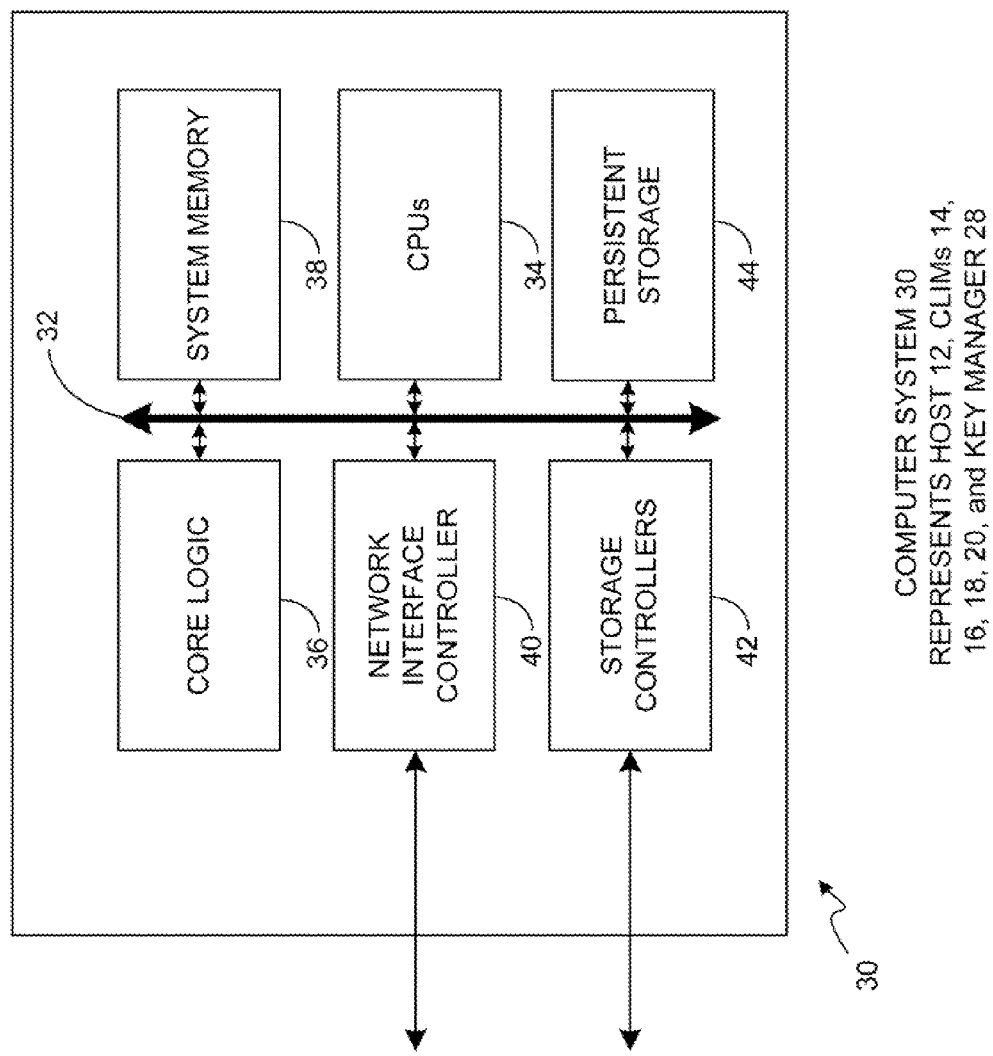
FIG. 2 shows a computer system that represents, in basic form, a host, cluster I/O managers, and a key manager, each of which is shown in FIG. 1, in accordance with examples of the present invention.

FIG. 2 shows a computer system 30 that represents, in basic form, host 12, CLIMs 14, 16, 18, and 20, and key manager 28. Computer system 30 includes a bus 32. Coupled to bus 32 are one or more CPUs 34, core logic 36, system memory 38, network interface controller 40, storage controllers 42, and persistent storage 44.

Although bus 32 is shown generically as a single bus, those skilled in the art will recognize that typically a variety of busses and fabrics are used to connect the components shown in FIG. 2. CPUs 34 may represent a single CPU, multiple CPUs in individual integrated circuit (IC) packages, multiple CPU cores in a discrete IC package, or any combination of these elements. Core logic 36 represents the core logic that couples CPUs 34, system memory 38, network interface controller 40, storage controllers 42, and persistent storage 44. In some architectures, core logic 36 includes a Northbridge and a Southbridge. However, other architectures are known in the art. For example, in some architectures, the memory controller is provided in the CPU.

For the purposes of describing examples of the present invention, core logic 36 also includes other components found in a typical computer system, such as firmware and I/O components, disk controllers for local persistent storage, USB ports, video controllers, and the like. In a server, some of these components may not be utilized. Persistent storage 44 represents storage used to store local copies of the operating system, applications, and other programs and data. Persistent storage 44 may represent devices such as hard disk drives, solid state drives, tape drives, optical drives, and the like. Alternatively, persistent storage may be provided external to computer 30. Network interface controller connects computer 30 to a network, such as LAN 26 in FIG. 1.

For host 12, storage controllers 42 represent the controllers that interface to the fabric coupling host 10 to the CLIMs 14, 16, 18, and 20. Examples of such fabrics are discussed above. For CLIMs 14, 16, 18, and 20, storage controllers 42 represent the controllers that couple the CLIMs to storage media 22 and 24. Examples of such connections are discussed above. In some configurations, these interfaces may be provided as part of core logic 36. Also note that key manager 28 may not require a storage controller 42 to access storage that is external to key manager 28.

Figure 3:
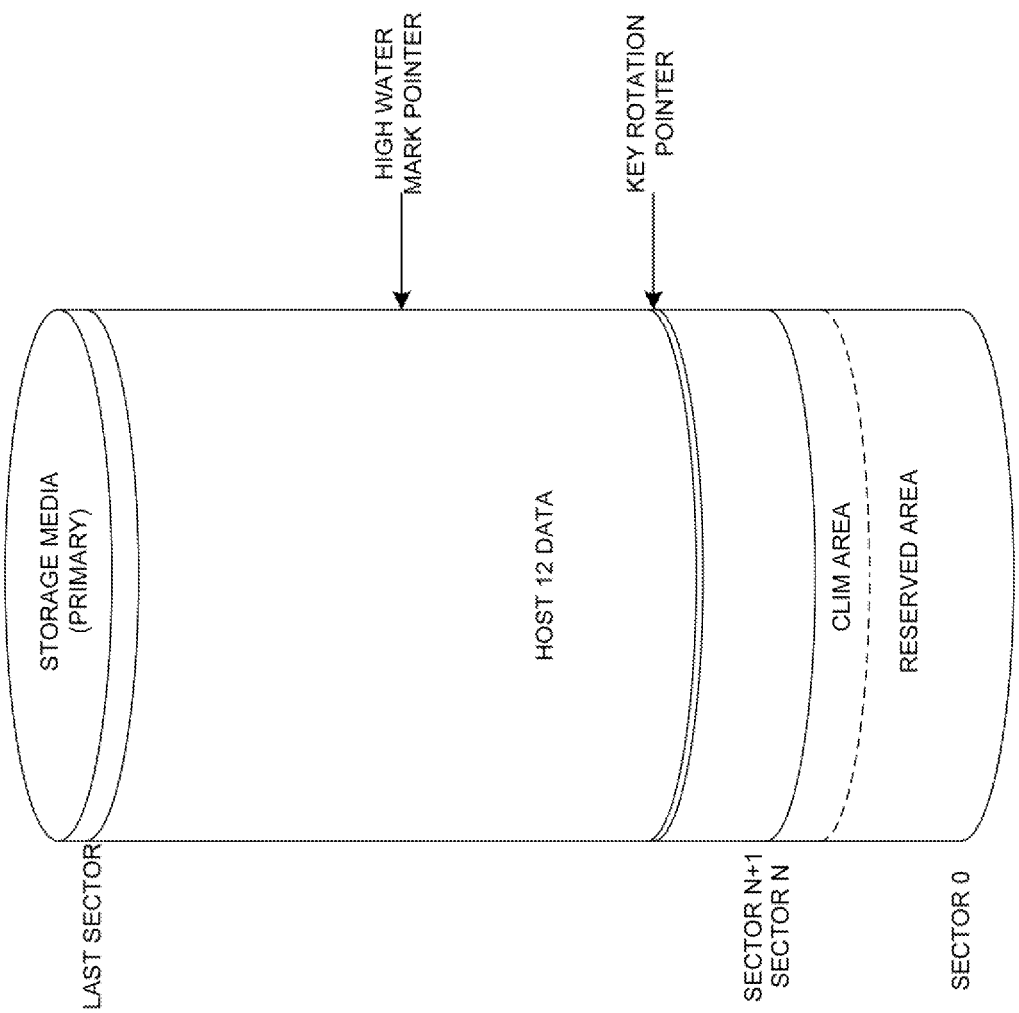
FIG. 3 is a block diagram of storage media shown in FIG. 1, in accordance with examples of the present invention.

FIG. 3 is a block diagram of storage media 22 of FIG. 1. A block diagram of storage media 24 would be substantially the same. Space on the media is identified by sectors from sector 0 to the last sector. A typical sector size is 512 bytes, but those skilled in the art will recognize that other sector sizes, such as 4096 bytes, may be used.

Sectors 0-N are reserved for system information, such as the media volume, and other information that identifies the media. Within this reserved area is an area reserved for the CLIMs to store information, such as data indicating whether or not the media is encrypted, the key name, an algorithm identifier that identifies the encryption algorithm, and key rotation information. The key itself is not stored on the media. The key is stored in key manager 28, and the key name is used to identify the key. Typically, the CLIM area will not be encrypted so that a CLIM may retrieve the key name to provide to key manager 28. Also shown in FIG. 3 are a key rotation pointer and a high water mark pointer. These pointers are indexes that identify a position within storage media 22, and are used during the key rotation process. These pointers will be described in greater detail below.

FIG. 4 shows CLIM memory 46, and the modules that operate the CLIMs. With reference to FIG. 2, if computer system 30 represents one of the CLIMs, the contents of CLIM memory 46 may exist at any point in time, in whole or in part, in system memory 38, persistent storage 44, and cache memories of CPUs 34 and core logic 36. Furthermore, code and data implementing the modules may be duplicated in the various components mentioned above.

CLIM memory 46 includes CLIM OS and applications 48. Within CLIM OS and applications 48 are media I/O module 50, key manager client module 52, encryption/decryption diem module 54, and key rotation module 56.

Media I/O module 50 manages I/O between host 12 and storage media 22 or 24. Key manager client module 52 communicates with key manager 28. Key manager client module 52 provides a key name from storage media 22 or 24 to key manager 28, and key manager 28 returns the encryption key used to encrypt and decrypt data stored on storage media 22 or 24.

Encryption/decryption module 54 cooperates with key manager client module 52 to receive the encryption key. In cooperation with media I/O module 50, encryption/decryption module 54 encrypts data blocks being written to storage media 22 or 24, and decrypts data blocks being read from storage media 22 or 24.

Finally, key rotation module 56 manages key rotation, including keeping track of which data blocks are encrypted with an old key, and which data blocks are encrypted with a new key, so that ongoing storage media access from host 12 uses the proper key. Key rotation module 56 cooperates with modules 50, 52, and 54 to implement key rotation. Key rotation will be described in greater detail below.

FIG. 5 shows key manager memory 58, and the modules that operate key manager 28. With reference to FIG. 2, if computer system 30 represents key manager 28, the contents of key manager memory 58 may exist at any point in time, in whole or in part, in system memory 38, persistent storage 44, and cache memories of CPUs 34 and core logic 36. Furthermore, code and data implementing the modules may be duplicated in the various components mentioned above.

Key manager memory 58 includes key manager OS and applications 60. Within key manager OS and applications 60 are key manager server module 62, key table 64, key policy management module 66, and key rotation initiator module 68.

Key manager server module 62 communicates with key manager client module 52. Encryption keys and key names are stored in key table 64. When a CLIM needs to receive an encryption key for the storage media attached to the CLIM, key manager client module 52 sends the key name to key manager server module 62, which in turn retrieves the key from key table 64 using the key name, and transmits the key to key manager module 52. Communication between key manager server module 62 and key manager client module 52 may occur over a secure channel, such as a channel using Hypertext Transfer Protocol Secure (HTTPS), or channels secured by Transport Layer Security (TLS) or Secure Sockets Layer (SSL).

Key policy manager module 66 enforces key management policies. For example, module 66 may enforce key rotation at periodic intervals, such as monthly or yearly. Key rotation initiator module 68 initiates key rotation. As will be discussed below, the key rotation initiation process includes signaling one of the CLIMs to suspend access to the media, while the other CLIM performs key rotation. Note that key policy management and key rotation initiation may also be performed by host 12, as described below.

FIG. 6 shows host memory 70, and includes the modules that operate host 12. With reference to FIG. 2, if computer system 30 represents host 12, the contents of host memory 70 may exist at any point in time, in whole or in part, in system memory 38, persistent storage 44, and cache memories of CPUs 34 and core logic 36. Furthermore, code and data implementing the modules may be duplicated in the various components mentioned above.

Host memory 70 includes host and OS applications 72. Within host and OS applications 72 are mirrored volume I/O manager 74, key policy management module 76, and key rotation initiator module 78.

Mirrored volume I/O manager 74 manages media I/O transfers such that each read operation stores data on primary storage media 22, with the data mirrored at storage media 24. Since two CLIMs are provided to each storage media, there are redundant paths to the storage media. Typically one path will be designated as an active path, and the other path will be designated as a backup path that is only used if the active path fails.

As mentioned above, both key manager memory 60 and host memory 70 have a key policy management module and a key rotation initiator module. In various examples of the present invention, these functions may be performed from host 12 or key manager 28, or a combination of key manager 28 and host 12. For example, host 12, could enforce a policy mandating monthly key rotation from key policy management module 76, and request that key rotation initiator module 68 of key manager 28 initiate key rotation. Conversely, key policy management module 66 of key manager 28 could enforce the key rotation policy, and request that key rotation initiator module 78 of host 12 initiate key rotation.

Figure 7:
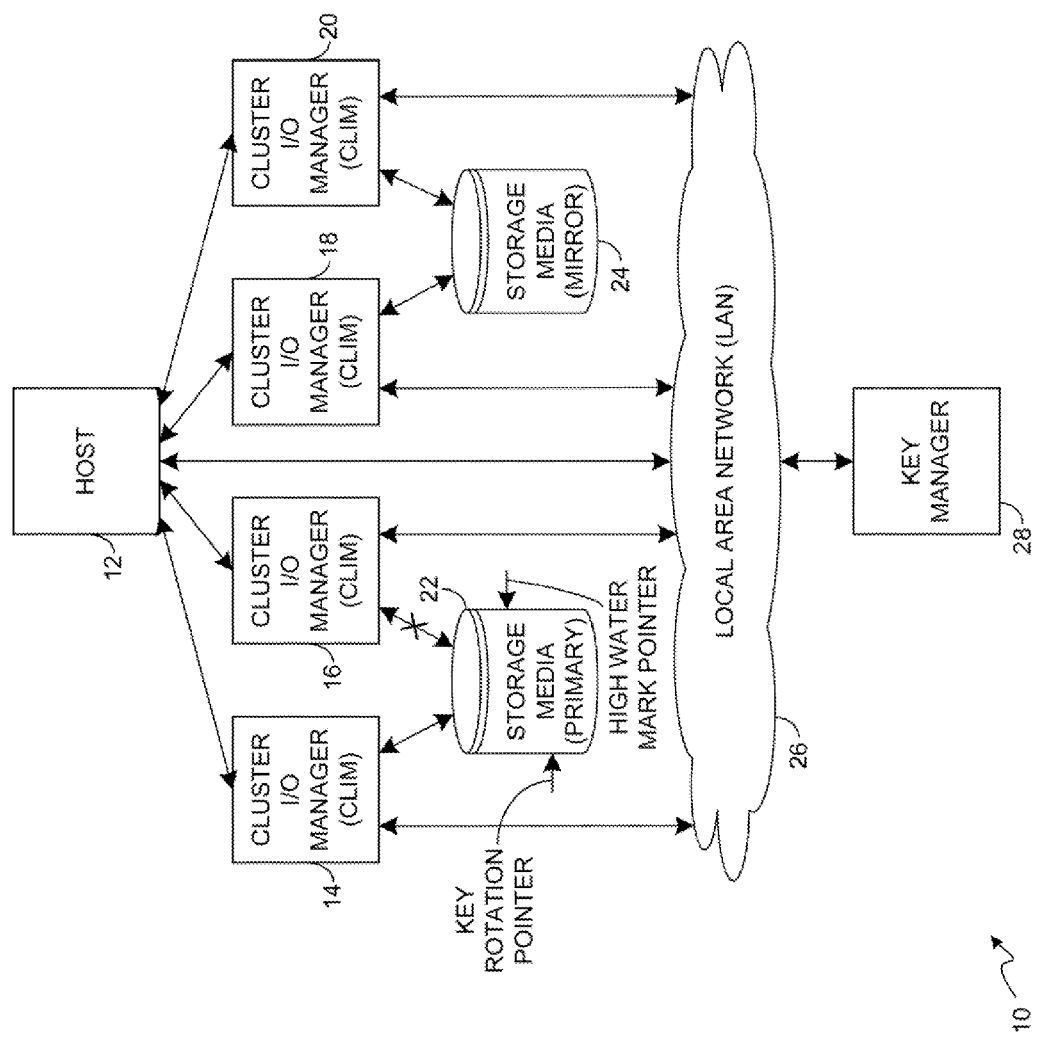
FIG. 7 shows the computer environment of FIG. 1 during key rotation, in accordance with examples of the present invention.

FIG. 7 shows computer environment 10 of FIG. 1 during key rotation. Key rotation may be launched manually by a system administrator, or via an automated process from key policy management module 66 of key manager 28, or key policy management module 76 of host 12. Either key rotation initiator module 68 of key manager 28 or key rotation initiator module 78 of host 12 will be signaled to initiate key rotation. In the example discussed below, key rotation will be performed upon storage media 22 by CLIM 14. However, CLIM 16 could also be used to perform the key rotation. Similarly, key rotation may be performed on storage media 24 by either CLIM 18 or 20.

In a mirrored volume, it is desirable to only perform key rotation on one storage media of the volume at a time. Should there be a failure of hardware or software during the key rotation process, the data remains intact and encrypted with a single key on the other storage media of the mirrored volume. Furthermore, since one CLIM is performing key rotation, the other CLIM will not know whether to access data using the old or new key. Therefore, access to the storage media by the other CLIM is suspended during key rotation.

Key rotation can take a considerable amount of time. However, areas of the storage media that are not used by the host to store data do not need to undergo key rotation. Accordingly, host 12 provides to key rotation module 56 of the CLIM performing the key rotation an indication of which portions of the storage media do not require key rotation. In some examples of the invention, the indication could be a full media map that indicates which sectors are used and not used. However, such a solution has high overhead as the map needs to be kept up to date, at least for the not-yet-reencrypted portions of the storage media, throughout the entire key rotation process. In another example of the present invention, host 12 provides a high water mark pointer indicating the highest sector on the storage media upon which data is stored. To optimize the effectiveness of the high water mark, it may be desirable to defragment the storage media first so that the high water mark can be as low as possible, thereby maximizing the amount of storage media capacity that does not require key rotation. The high water mark pointer needs to be updated throughout the entire key rotation process, but as will be shown below, the updating can be done with very low overhead.

With reference to the example shown in FIG. 7, when key rotation is initiated by either key rotation initiator module 68 of FIG. 5 or key rotation initiator module 78 of FIG. 6, module 68 or 78 signals CLIM 16 to suspend access to storage media 22. This is represented in FIG. 7 by the "X" in the link between CLIM 16 and storage media 22. Next, module 68 or 78 signals host 12 to provide the indication of which portions of storage media 22 do not require key rotation. In FIGS. 3 and 7, this indication is represented by the high water mark pointer.

Next, module 68 or 78 signals key manager client module 52 of CLIM 14 and key manager server module 62 of FIG. 5 of key manager 28 to negotiate a new encryption key. The new key is generated by key manager server module 62, stored in key table 64, and provided to key rotation module 56 of CLIM 14.

At this point, key rotation manager 56 of CLIM 14, in cooperation with modules 50, 52, and 54 of CLIM 14, begins key rotation. Key rotation is performed in blocks, with a block being read from storage media 22, decrypted with the old key, encrypted with the new key, and written back to storage media 22. A typical block size is 256 kilobytes. While it is more efficient to perform key rotation on larger blocks, the block contents are not available to host 12 during key rotation, so smaller blocks minimize unavailability. One implementing examples of the present invention may select block size to balance efficiency and availability.

In FIGS. 3 and 7, as key rotation proceeds toward the high water mark pointer, the key rotation pointer points to the block undergoing key rotation. With reference to FIG. 3, data blocks between the beginning of host 12 data and the key rotation pointer are encrypted with the new key, and data areas between the key rotation pointer and the high water mark pointer are encrypted with the old key.

During key rotation, CLIM 14 continues to service storage media I/O requests from host 12. If an I/O request is for data that has undergone key rotation, the new key is used to decrypt the data for read requests and encrypt the data for write requests. If the I/O request is for data that has not undergone key rotation, the old key is used. If the I/O request is for data within a data block currently undergoing key rotation at the data block referenced by the key rotation pointer, they I/O request is deferred until key rotation for that data block has been completed after which the new key is used to service the I/O request. Finally, if an I/O write request is received for data stored between the high water mark pointer and the last sector, the high water mark pointer is reset to the block referenced in the I/O request.

The examples of the invention described above provide many advantages. The CLIM performs key rotation, so host 12 is not burdened with managing the key rotation process. The CLIM performing key rotation continues to service all I/O requests from host 12 during key rotation, so data continues to be available to host 12. At any time, the CLIM can throttle or suspend key rotation to service I/O requests from host 12, thereby providing full I/O bandwidth to host 12. Areas of storage media 12 that are not used by host 12 do not need to undergo key rotation, thereby optimizing the key rotation process. Finally, complete mirrored operation continues with storage media 24.

When the key rotation pointer reaches the high water mark pointer, key rotation is finished. At this point, key rotation module 56 signals key rotation initiator module 68 or 78 that key rotation is complete, and module 68 or 78 signals CLIM 16 to resume access to storage media 22. If desired, key rotation can now be initiated on storage media 24 using the process described above.

Figure 8:
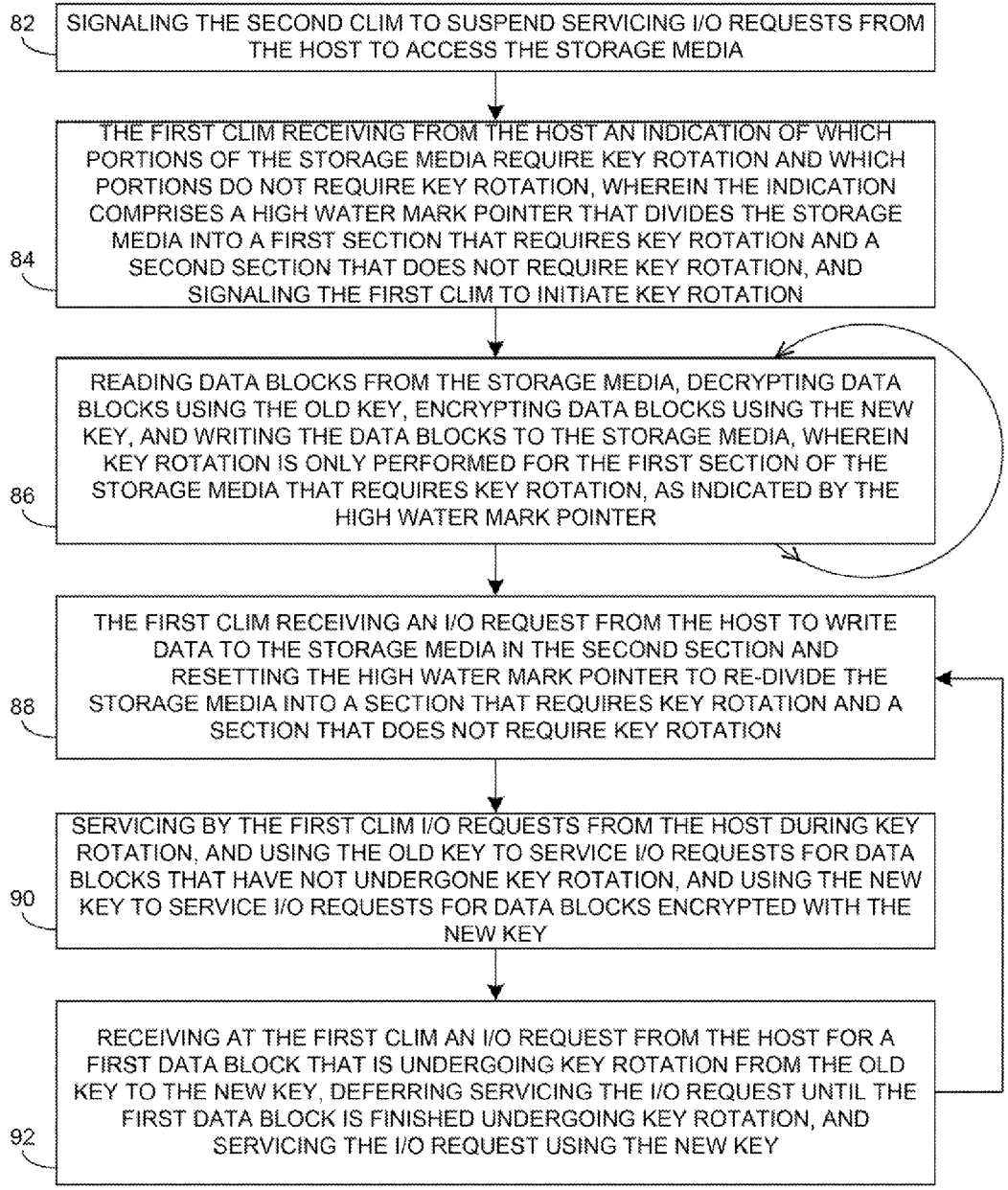
FIG. 8 shows a flowchart that illustrates a method for performing key rotation, in accordance with examples of the present invention.

FIG. 8 shows a flowchart 80 that illustrates a method in accordance with examples of the present invention. Flowchart 80 is merely representative and simplified compared to an actual implementation. Those skilled in the art will recognize that the blocks shown in flowchart 80 would typically be implemented by many execution threads operating simultaneously.

Flowchart 8 refers to first and second CLIMs. The first CLIM is the CLIM that performs the key rotation, and the second CLIM is the CLIM that suspends access to the storage media during key rotation. In the example discussed above with reference to FIG. 7, the first CLIM is CLIM 14, and the second CLIM is CLIM 16.

Flowchart 80 starts at block 82, where the second CLIM is signaled to suspend servicing I/O requests from the host to access the storage media. Control passes to block 84. At block 84, the first CLIM receives from the host an indication of which portions of the storage media require key rotation, and which portions do not require key rotation. In the example shown in FIG. 3, the high water mark pointer is the indication, the first section of the storage media that requires key rotation is between sector N+1 and the high water mark pointer, and the second section of the storage media that does not require key rotation is between the high water mark pointer and the last sector. Finally, the first CLIM is signaled to initiate key rotation. Control passes to block 86.

Block 86 represents a loop that performs key rotation of the first section of the storage media that requires key rotation. For each block of data that needs key rotation, block 86 reads the data block from the storage media, decrypts the data block using the old key, encrypts the data block using the new key, and writes the data block back to the storage media. As mentioned above, key rotation is only performed for the portions of the storage media that require key rotation, as indicated by the high water mark. Control passes to block 88.

Before considering block 88, consider the loop shown along the left edge of block 86. The loop represents the key rotation process as the key rotation pointer of FIG. 3 moves through the first section of the storage media toward the high water mark pointer. Although not shown in block 86, when key rotation is complete for the first section, the first CLIM resumes normal operation, and the second CLIM is signaled to resume servicing I/O requests from the host to access the storage media.

Blocks 88, 90, and 92 represent processing I/O requests from the host while the storage media is undergoing key rotation. Whether a particular block is executed is dependent on whether the I/O request discussed in the block is initiated by the host.

At block 88, the first CLIM receives an I/O request from the host to write data to the storage media in the second section. As mentioned above, the second section was identified in block 84 as not needing key rotation because data is not stored in the second section. However, when the I/O write request is serviced, data requiring key rotation will be stored in the second section. Accordingly, block 88 resets the high water mark pointer to re-divide the storage media. The data block referenced by the I/O request is now in the first section. Control passes to block 90.

At block 90, I/O requests from the host are serviced during the key rotation process that is underway in block 86, including any I/O write requests identified in block 88. The old key is used to service I/O requests for data blocks that have not undergone key rotation, while the new key is used to service I/O requests for data blocks encrypted with the new key. Control passes to block 92.

At block 92, the first CLIM receives an I/O request for a data block that is currently undergoing key rotation at block 86. Accordingly, the I/O request cannot be serviced until that key rotation operation is complete, so the I/O request is deferred until the key rotation is complete for the data block, at which point, the I/O request is serviced using the new key. Control passes back to block 88.

Blocks 88, 90, and 92 continue to execute until block 86 is finished performing key rotation on the first section of the storage media. As discussed above, the size of the first section may be adjusted at block 88. When block 86 has finished key rotation, the loop through blocks 88, 90, and 92 is terminated after any outstanding I/O requests have completed, and the first CLIM (along with the second CLIM) are returned to normal operation.

In the foregoing description, numerous details are set forth to provide an understanding of the present invention. However, it will be understood by those skilled in the art that the present invention may be practiced without these details. While the invention has been disclosed with respect to a limited number of examples and embodiments, those skilled in the art will appreciate numerous modifications and variations therefrom. It is intended that the appended claims cover such modifications and variations as fall within the true spirit and scope of the invention.

What is claimed is:

1. A method of performing key rotation in a computing environment having a host, a first storage media, first and second I/O managers coupled between the host and the first storage media, a second storage media that mirrors the first storage media to create a mirrored volume, and a third I/O manager coupled between the host and the second storage media, the method comprising:
    signaling the second I/O manager to suspend servicing I/O requests from the host to access the first storage media;
    signaling the first I/O manager to perform a first key rotation by reading data blocks from the first storage media, decrypting the data blocks using an old key, encrypting the data blocks using a new key, and writing the data blocks to the first storage media; and
    once the first key rotation is complete, signaling the third I/O manager to perform a second key rotation on the second storage media.

2. The method of claim 1 and further comprising:
    receiving from the host an indication of which portions of the first storage media require key rotation and which portions do not require key rotation; and
    performing key rotation only for the portions of the first storage media that require key rotation, as indicated by the indication.

3. The method of claim 2 wherein the indication comprises a high water mark pointer that divides the first storage media into a first section that requires key rotation and a second section that does not require key rotation.

4. The method of claim 3 and further comprising:
    receiving an I/O request from the host to write data to the first storage media in the second section; and
    resetting the high water mark pointer to re-divide the first storage media into a section that requires key rotation and a section that does not require key rotation.

5. The method of claim 3 and further comprising:
    servicing by the first I/O manager I/O requests from the host during key rotation;
    using the old key to service I/O request for data blocks that have not undergone key rotation; and
    using the new key to service I/O requests for data blocks encrypted with the new key.

6. The method of claim 5 and further comprising:
    receiving at the first I/O manager an I/O request from the host for a first data block that is undergoing key rotation from the old key to the new key;
    deferring servicing the I/O request until the first data block is finished undergoing key rotation; and
    servicing the I/O request using the new key.

7. A non-transitory machine-readable media having computer executable program segments stored thereon, the computer executable program segments comprising:
    a media I/O module operated to receive I/O requests from a host and servicing the I/O requests to a first storage media and a second storage media that mirrors the first storage media;
    a key manager client module to cooperate with a key manager server module to receive a key;
    an encryption/decryption module operated to encrypt data blocks written to the first storage media and decrypting data blocks read from the first storage media using the key; and
    a key rotation module operated to:
        use an indication of first storage media usage from the host to rotate keys from an old key to a new key for blocks of the first storage media used by the host during a first key rotation;
        once the first key rotation is complete, rotate keys from the old key to the new key for blocks of the second storage media used by the host during a second key rotation; and
        not rotate keys for blocks of the first storage media not used by the host.

8. The readable media of claim 7 wherein the indication of first storage media usage comprises a high water mark pointer that divides the first storage media into a first section that requires key rotation and a second section that does not require key rotation.

9. The readable media of claim 8 wherein when the media I/O module receives an I/O request from the host to write data to a first block of the first storage media in the second section, the media I/O module signals the key rotation module to reset the high water mark pointer to re-divide the first storage media so that the first block is in the first section.

10. The readable media of claim 8 wherein the media I/O module cooperates with the encryption/decryption module and the key rotation module to service I/O requests during key rotation, with the old key used to service I/O requests for data block that have not undergone key rotation, and the new key used to service I/O requests for data block that have been encrypted with the new key.

11. The readable media of claim 10 wherein the media I/O module cooperates with the encryption/decryption module and the key rotation module during key rotation to defer servicing I/O requests for a data block that is undergoing key rotation until that key rotation operation is finished, and then servicing the I/O request using the new key.

12. A computing environment comprising:
- a host comprising a processor and memory;
- a first storage media;
- first and second I/O managers coupled to the host and the first storage media, wherein the second I/O manager is signaled to suspend servicing I/O requests from the host to the first storage media during key rotation; and the first I/O manager includes:
  - a media I/O module that receives I/O requests from the host and servicing the I/O requests to the first storage media;
- a second storage media;
- a third I/O manager coupled to the host and the second storage media, wherein the host includes a mirrored volume I/O manager and combines the first and second storage media into a mirrored volume, wherein the third I/O manager is prevented from rotating a key of the second storage media while the first storage media is undergoing key rotation;
- a key manager client module that cooperates with a key manager server module to request and receive a key;
- an encryption/decryption module that encrypts data blocks written to the first storage media and decrypting data blocks read from the first storage media using the key; and
- a key rotation module to:
  - rotate keys from an old key to a new key for blocks of the first storage media during a first key rotation; and
  - once the first key rotation is complete, rotate keys from the old key to the new key for blocks of the second storage media during a second key rotation.

13. The computing environment of claim 12 wherein the key rotation module receives an indication of the first storage media usage from the host, and only performs key rotation upon blocks used by the host.

14. The computing environment of claim 13 wherein the indication of storage media usage comprises a high water mark pointer that divides the first storage media into a first section that requires key rotation and a second section that does not require key rotation.

15. The computing environment of claim 14 wherein when the media I/O module receives an I/O request from the host to write data to a first data block of the first storage media in the second section, the media I/O module signals the key rotation module to reset the high water mark pointer to re-divide the first storage media so that the first data block is in the first section.

16. The computing environment of claim 15 wherein the media I/O module cooperates with the encryption/decryption module and the key rotation module to service I/O requests during key rotation, with the old key used to service I/O requests for data blocks that have not undergone key rotation, and the new key used to service I/O requests for data block that have been encrypted with the new key.

17. The computing environment of claim 14, wherein the first storage media is defragmented and the high water mark is lowered.

18. The computing environment of claim 12 and further comprising:
- a key manager coupled to the first and second I/O managers, the key manager including:
  - a key manager server module to provide keys to the key manager client module of the first I/O module; and
  - a key table that stores and associates key names with keys.

19. The computing environment of claim 18, wherein the key manager further includes:
- a key policy manager module that determines when keys should be rotated; and
- a key rotation initiator module that signals the second I/O manager to suspend servicing I/O requests during key rotation, and signaling the first I/O manager to initiate key rotation.

20. The computing environment of claim 12 wherein the host includes:
- a key policy manager module that determines when keys should be rotated; and
- a key rotation initiator module that signals the second I/O manager to suspend servicing I/O requests during key rotation, and signaling the first I/O manager to initiate key rotation.

* * * * *